United States Patent

[11] 3,586,266

[72] Inventor Paul Bucher
 68-19 31st Ave., Jackson Heights, N.Y. 11372
[21] Appl. No. 761,976
[22] Filed Sept. 24, 1968
[45] Patented June 22, 1971

[54] JET PROPELLED AIRCRAFT WITH AUXILIARY LIFTING MEANS
 1 Claim, 15 Drawing Figs.
[52] U.S. Cl. .................................... 244/36, 244/13, 244/40, 244/45
[51] Int. Cl. .................................... B64c 1/26, B64c 3/06
[50] Field of Search .................................... 244/40, 45, 35, 36, 13

[56] References Cited
 UNITED STATES PATENTS
 981,185 1/1911 Fowler .................................... 244/35 X
 1,906,017 4/1933 Sundling .................................... 244/45
 3,285,538 11/1966 Burhelli .................................... 244/36
 3,397,854 8/1968 Reyle .................................... 244/45 X Primary Examiner—Milton Buchler
Assistant Examiner—Jeffrey L. Forman
Attorney—Polachek & Saulsbury ABSTRACT: A wing is mounted on top of the streamlined body of a jet propelled aircraft. The wing has a plurality of channels therethrough. Air flowing through the wing provides lift for the body supplementing the lift of the lateral wings, so that the lateral wings can be made smaller. A shorter runway will be required for takeoff and landing and a slower landing speed is made possible. The aircraft will be able to fly at higher maximum speed. The wing may be provided with movable flaps in the several channels for use in braking the aircraft while landing. The channels can feed air directly to the jet engines of the aircraft to improve draft and conserve fuel. An aircraft can be provided with a nose shaped like a duck's bill to provide still further lift in cooperation with the multichanneled wing.

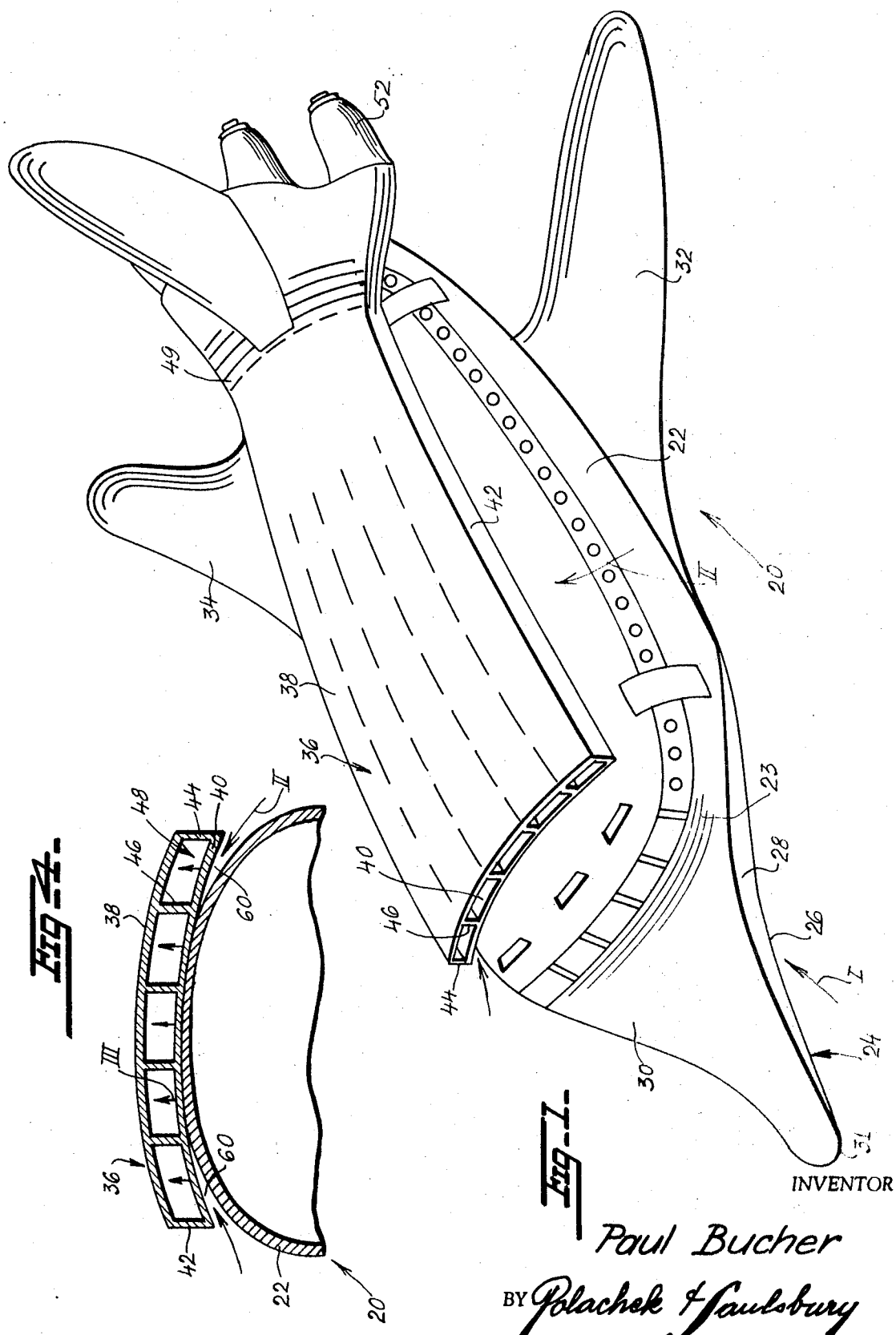

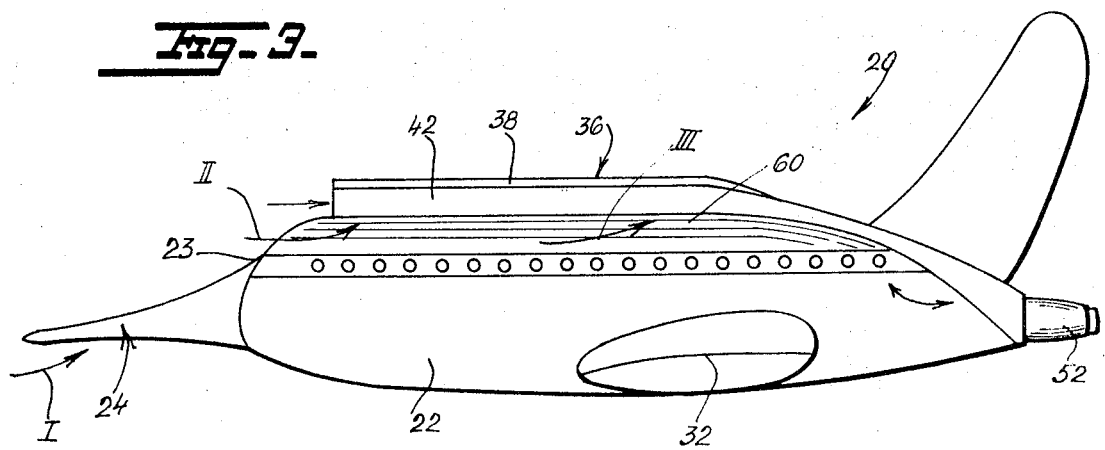
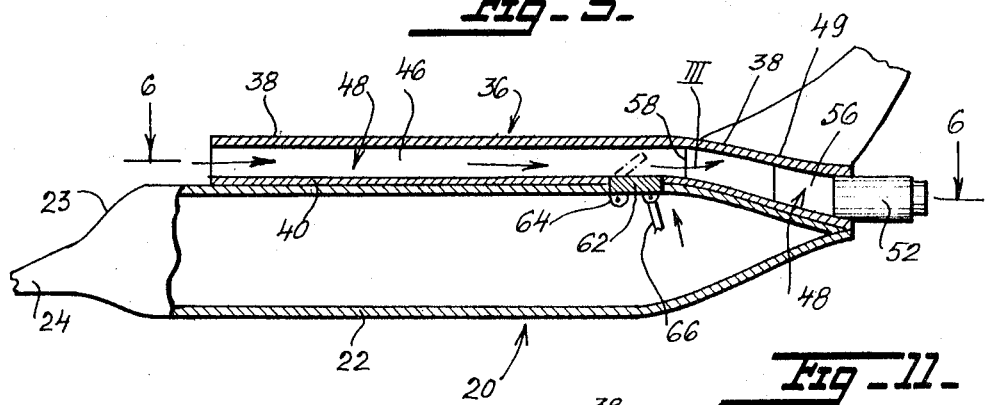
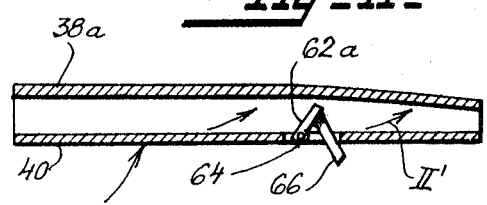
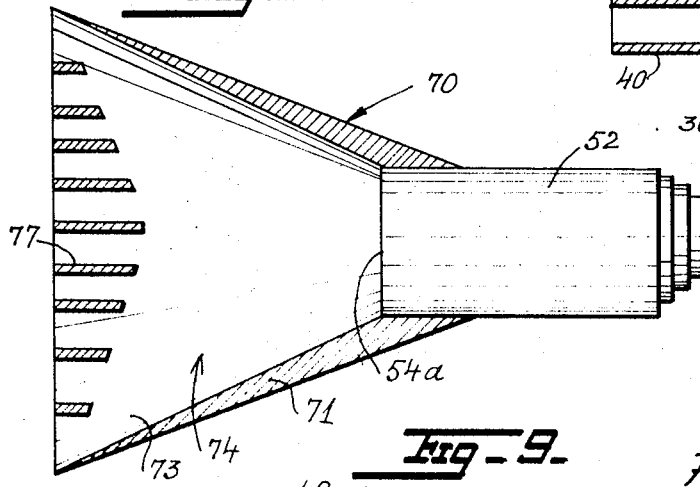
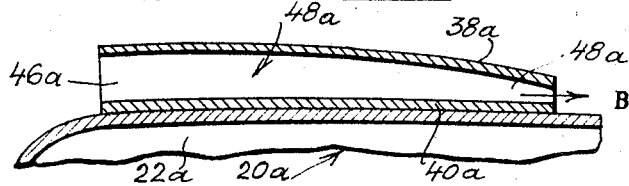
INVENTOR
Paul Bucher
BY Polachek & Saulsbury
ATTORNEYS INVENTOR
Paul Bucher
BY Polachek & Saulsbury
ATTORNEYS

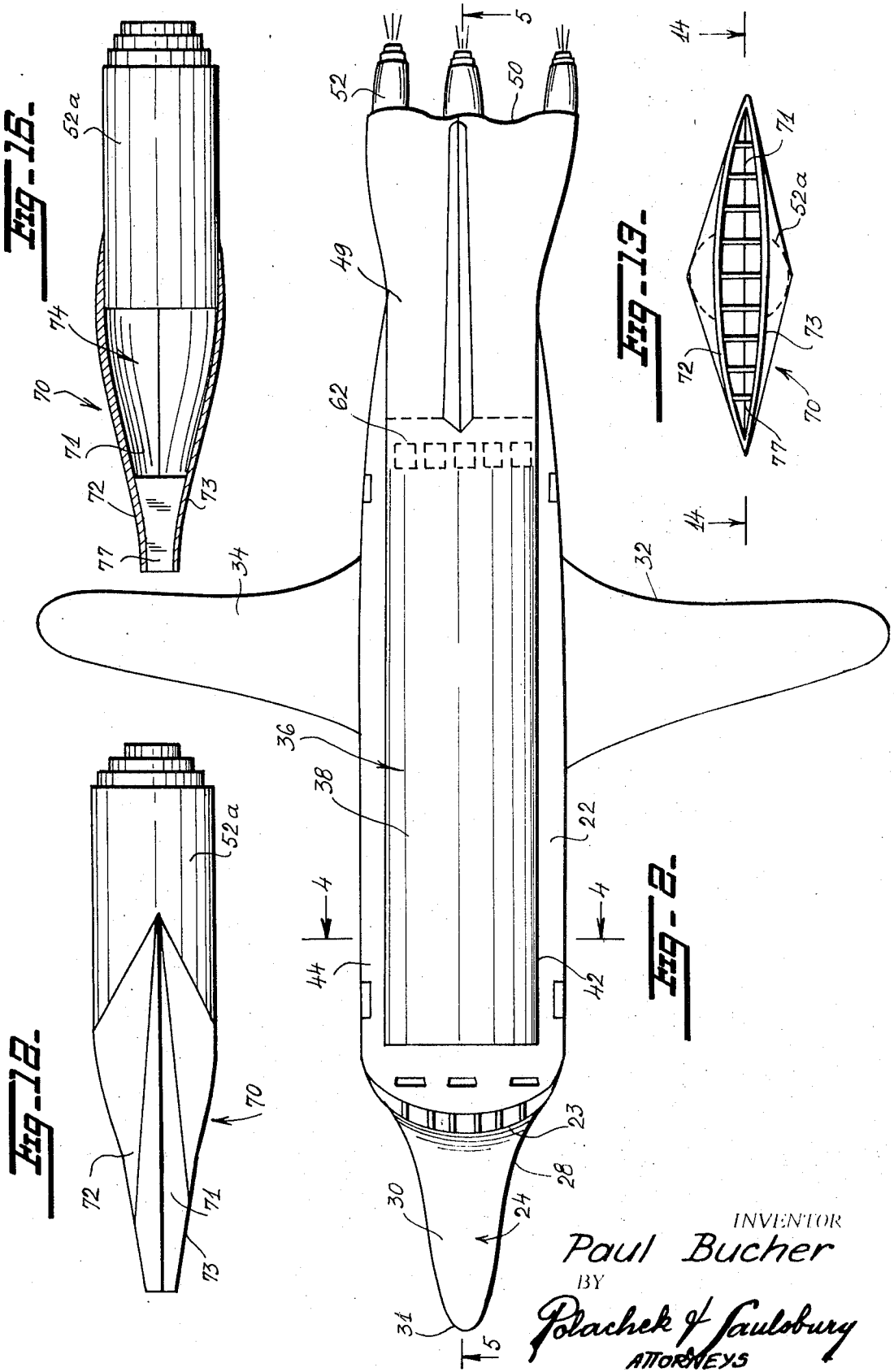

JET PROPELLED AIRCRAFT WITH AUXILIARY LIFTING MEANS

The invention relates to jet propelled aircraft and more particularly concerns aircraft equipped with a supplemental wing having multiple channels.

According to the invention, a supplementary wing is mounted on top of the streamlined body of a jet propelled aircraft. The wing is arcuate in cross section at the front and lateral sides are spaced from the fuselage of the aircraft. A plurality of channels extend longitudinally of the wing. The channels are open at the front so that air passes in freely. The air passing through the wing exerts a lifting effect. In addition, air under the wing at both sides exerts a further stabilizing lifting effect. The rear end of the wing can be shaped to provide a streamlined intake to the jet engines. The wing makes it possible to fly an aircraft at higher speed for a given expenditure of power, and at higher maximum speed for a given weight and size of aircraft. The wing also makes it possible to takeoff on shorter runways than has heretofore been possible for high-speed jet aircraft. A tapered nose-shaped like a duck's bill may also be added to provide additional lift and to help the aircraft pass through the sound barrier to supersonic speeds. Movable flaps in the channels of the wing can be used for braking purposes in landing so that slower landing speeds are made possible and shorter runways for landing can be used. Streamlined ducts may be provided in the wing leading from the channels in the wing to inlets of the jet engines of the aircraft to improve draft, reduce fuel consumption, reduce operating temperatures, lower operating noise levels, and increase maximum flying speed.

Various objects, features and advantages of the invention will become apparent upon reading the following specification together with the accompanying drawing forming a part thereof.

Referring to the drawing:

FIG. 1 is a perspective view of an aircraft embodying the invention.

FIG. 2 is a top plan view of the aircraft.

FIG. 3 is a side elevational view.

FIG. 4 is a fragmentary cross-sectional view taken on line 4–4 of FIG. 2.

FIG. 5 is a longitudinal section view taken on line 5–5 of FIG. 2.

FIG. 9 is a fragmentary vertical sectional view taken on line 9–9 of FIG. 8.

FIG. 11 is a vertical sectional view taken on line 11–11 of FIG. 10.

FIG. 12 is a side view of an engine of the aircraft of FIG. 7 with an auxiliary wing thereon, taken on line 12–12 of FIG. 7.

FIG. 13 is a front view of the engine and wing of FIG. 12.

FIG. 14 is a horizontal sectional view taken on line 14–14 of FIG. 13.

FIG. 15 is a vertical sectional view taken on line 15–15 of FIG. 14.

Figure 6:
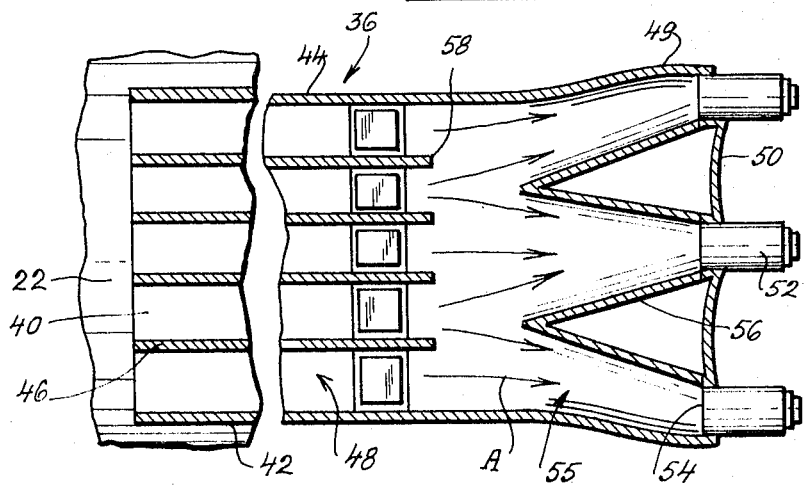
FIG. 6 is an enlarged horizontal sectional view, with portions broken away, taken on line 6–6 of FIG. 5.
Figure 8:
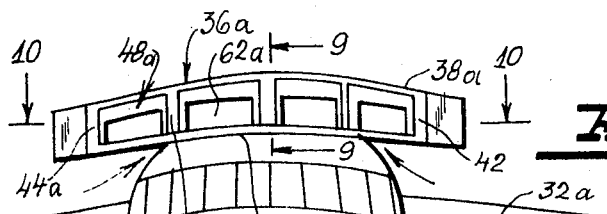
FIG. 8 is a front elevational view of the aircraft of FIG. 7.
Figure 10:
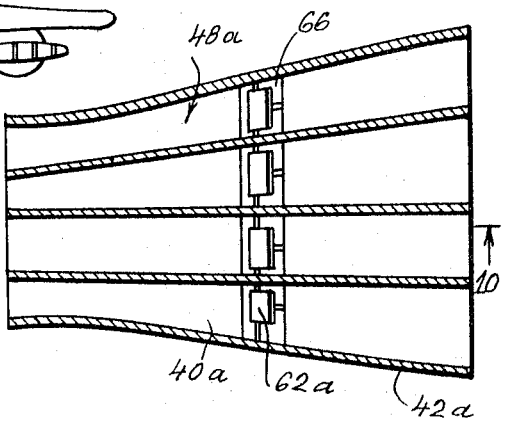
FIG. 10 is a horizontal sectional view taken on line 10–10 of FIG. 8.
Figure 7:
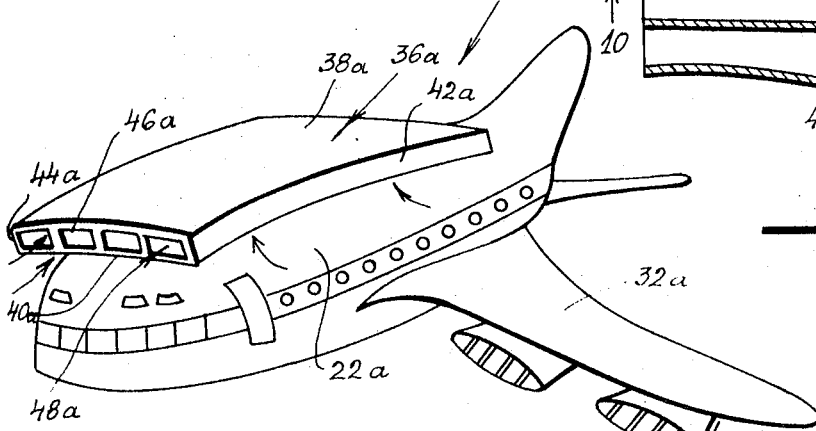
FIG. 7 is a perspective view of an aircraft embodying another form of the invention.

Referring first to FIGS. 1—6, there, is shown an aircraft 20 having a streamlined elongated body or fuselage 22. Extending forwardly of the front 23 of body 22 is a tapered nose 24 which has a flat bottom 26. Sides 28 flare laterally and rearwardly to the front of body 22. Top 30 curves smoothly upwardly from the narrow front end 31 of the nose to the front of body 22 (See FIG. 3). Extending laterally of body 22 are wings 32,34 which are shorter than those normally provided on an aircraft of this type.

On top of body 22 is a generally rectangular supplementary wing 36. The wing 36 has a unitary structure with top wall 38, bottom wall 40 and sidewalls 42,44. A plurality of vertical parallel partitions 46 define a plurality of channels 48 extending longitudinally of the wing. The wing is arcuate in cross section as clearly shown in FIG. 1 and FIG. 4. The rear end 49 of the wing flares outwardly laterally as best shown in FIG. 6. In end wall 50 are jet engines 52 having their inlet ends 54 open to tapered ducts 55. The ducts are defined by V-shaped partitions 56. The ends 58 of the partitions 46 are spaced forwardly of the ducts so that the rear ends of channels 48 communicate with the wider inlet ends of the ducts as shown by arrows A indicating air flow in FIG. 6. Thus, each engine is fed by a flow of air whose velocity is higher at the outlet end of a duct 55 than at its inlet end. It will be noted in FIG. 5 that the upper wall 38 slants down at the rear end of the wing 36. This produces a lifting effect when air flows through channels 48. The center portion of bottom wall 40 is secured by welding or otherwise to the top of the body 22. Lateral portions of bottom wall 40 are spaced from the downwardly curved sides of the body 22 defining laterally open channels 60. Air entering and flowing along these channels exerts a lifting effect at the sides of the body 22.

By arrangement described above, there is a triple supplementary lifting effect. The nose 24 exerts a first lifting effect at the front of the aircraft indicated by arrow I in FIGS. 1 and 3. A second lifting effect is exerted at the sides of the aircraft indicated by arrows II in FIGS. 1, 3 and 4. A third lifting effect is exerted near the rear end of body 22 in channels 48 as indicated by arrows III in FIGS. 4 and 5. All these lifting effects supplement the lift of the shorter than normal lateral wings 32, 34.

Flaps 62 can be pivotally mounted in the several channels near their rear ends as best shown in FIG. 5. These flaps can be tilted upwardly at their front ends on hinges 64 by linkages 66 connected to suitable mechanical or hydraulic actuating means (not shown). When the flaps are tilted upwardly they partially obstruct the channels 48 and exert a braking effect which is employed during landing of the aircraft or in the event rapid deceleration is required. These flaps make it possible to land on a shorter runway than is normally required for an aircraft of this type.

The engines 52 are fed by air which has left the channels 48 and is directed in narrowing ducts 55 into the engines. This increases the draft of air normally drawn in by the jet engines to increase their driving power while reducing their fuel consumption.

The effects of the several innovations described are to increase the operating speed of the aircraft for a given expenditure of power, to increase the maximum flying speed and load carrying capacity, to reduce engine noise, and in general to improve ease of maneuverability and operating efficiency.

Landing gear and other conventional parts of the aircraft are omitted from the several figures to simplify the drawing.

In FIGS. 7—11 there is shown another aircraft 20A having a supplementary wing 36a mounted on body 22a. This form of the invention is especially adapted for use on conventional aircraft. Wing 36a has four channels 48a defined by top wall 38a, bottom wall 40a, partitions 46a, and flaring sidewalls 42a,44a. Rear ends 48a' of the channels are open so that air flows through with minimum drag. The top wall 38a slants downwardly at the rear with respect to horizontal bottom wall 40a to provide the lifting effect indicated by arrows III' in FIG. 11. Flaps 62a are pivotally mounted in the several channels for braking or deceleration purposes. Arrows II' in FIG. 7 indicate the lifting effect under the lateral portions of the bottom wall 40a of the wing.

The jet engines 52a attached to wings 32a,34a of the aircraft are provided with auxiliary wings 70 which provide a further lifting effect and increase the flow of air into the engines. As best shown FIGS. 12—15, each wing 70 is a hollow tapered structure with inner rearwardly tapered sidewalls 71 and flaring top and bottom walls 72,73 defining a channel 74 leading into the inlet end 54a of each engine. At the horizontally wider front end of the wing are narrow, vertical spaced partitions 77 which decrease turbulence of air and direct it in a plurality of streams into channel 74. Thus, more air than usual enters the engine. The air stream impinging on the walls of the wing 70 exerts a lifting effect which can be as much as 50 percent of the weight of the engine. Wings 70 in cooperation with wing 36a produce lifting and other effects which increase the overall operating efficiency of the aircraft. Its maximum flying or cruising speed will be increased. It will be able to fly faster for a given amount of fuel consumption and its load carrying capacity will be increased.

While I have shown and described what I believe to be the best embodiment of my invention, it will be apparent to those skilled in the art that various changes and modifications may be made therein without departing from the spirit and scope of the invention as defined in the appended claims.

What I claim is:

1. The combination in an aircraft of a nose portion, opposite side portions rearward of said nose portion and an elongated streamlined axially horizontal body having a pair of lateral wings projecting from said side portions on opposite sides, a supplementary hollow wing mounted in a horizontal position on said body and extending between front and rear ends thereof, said wing having spaced top and bottom walls, vertical sidewalls and a plurality of partitions between said top, bottom and sidewalls defining a plurality of first channels in the supplementary wing, said channels being open at their opposite forward and rearward ends so that air flowing through the channels exerts a lifting effect on the aircraft, opposite side portions of the bottom of the supplementary wing being spaced from the marginal parts of said opposite side portions of said body to define open second channels along which air flows to exert a further lifting effect on the aircraft, and a plurality of forward propulsion units supported on said body for driving said aircraft, said plurality of forward propulsion units comprises jet engines supported on said body at the rearward end of said first channels of said supplementary wing, the latter having tapered duct therein located at said rearward end of said first channels and communicating with inlet ends of said engines for supplying air thereto.